United States Patent [19]

Nose

[11] Patent Number: 4,751,374
[45] Date of Patent: Jun. 14, 1988

[54] CARD AUTHORIZATION APPARATUS
[75] Inventor: Eishi Nose, Kyoto, Japan
[73] Assignee: Omron Tateisi Electronics Co., Kyoto, Japan
[21] Appl. No.: 917,552
[22] Filed: Oct. 10, 1986
[30] Foreign Application Priority Data Nov. 6, 1985 [JP] Japan .................................. 60-249898

[51] Int. Cl.$^4$ ............................................. G06K 5/00
[52] U.S. Cl. ..................................... 235/380
[58] Field of Search ........................................ 235/380

[56] References Cited

U.S. PATENT DOCUMENTS 4,025,760  5/1977  Trenkamp ........................... 235/380

Primary Examiner—Harold I. Pitts
Attorney, Agent, or Firm—Stevens, Davis, Miller & Mosher

[57] ABSTRACT

A master machine transmits a request for transmission of authorization data to a satellite machine when a mode key is set at a summation instructing mode. The master machine sums the authorization data received from the satellite machine and then designates a subsequent object machine upon receiving of a data transmission end command. When summation processing is completed with respect to all of the designated satellite machines, the master machine issues a summary report. When the mode key is set at an clearing instructing mode, the master machine outputs commands for clearing of the authorization data to the respective satellite machines.

2 Claims, 4 Drawing Sheets

CARD AUTHORIZATION APPARATUS

BACKGROUND OF THE INVENTION

1. Field of the Invention

The present invention relates to a card authorization apparatus, and more particularly, it relates to a card authorization apparatus which is adapted to sum authorization data on items such as card numbers, account numbers, article codes, amounts, methods of payment and the like issued in a credit sale.

2. Description of the Prior Art

With popularization of credit cards, a card authorization apparatus called a credit authorization terminal (CAT) has been put into practice in order to authorize credit cards and automate transaction processing. Such a CAT is installed in every salesroom of a department store or the like selling articles on credit, so that customers can purchase articles through credit cards.

In such credit sale, a clerk in charge causes the customer's credit card to be read by a card reader included in the CAT and operates a keyboard thereof to enter transaction data. The transaction data are transmitted to a credit company, which in turn determines whether or not the transaction is allowable. When the transaction is authorized, the CAT stores authorization data on items such as the credit card number, the account number, the article codes, the amount of charge and the method of payment. When a day's credit sale is completed, an operator operates the respective CATs to print out the authorization data, thereby to prepare a summary report by summing the authorization data printed out by the CATs.

In the conventional card authorization apparatus of the aforementioned structure, the operator must sum the authorization data with troublesome operation, which occasionally results in errors in summation.

SUMMARY OF THE INVENTION

It is a principal object of the present invention to provide a card authorization apparatus which automatically sums authorization data received from other card authorization apparatuses having no data summing function.

Briefly stated, the present invention provides a card authorization apparatus which transmits requests for transmission of authorization data to other card authorization apparatuses having no data summing function through transmission control means in response to an instruction by a summation instructing means to sum the authorization data received from the other card authorization apparatuses. The apparatus of the invention sums the authorized data received and issues a summary report based on the summed authorization data by a summary report issuing means.

According to the present invention, a summary report can be quickly prepared with no error in summation.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
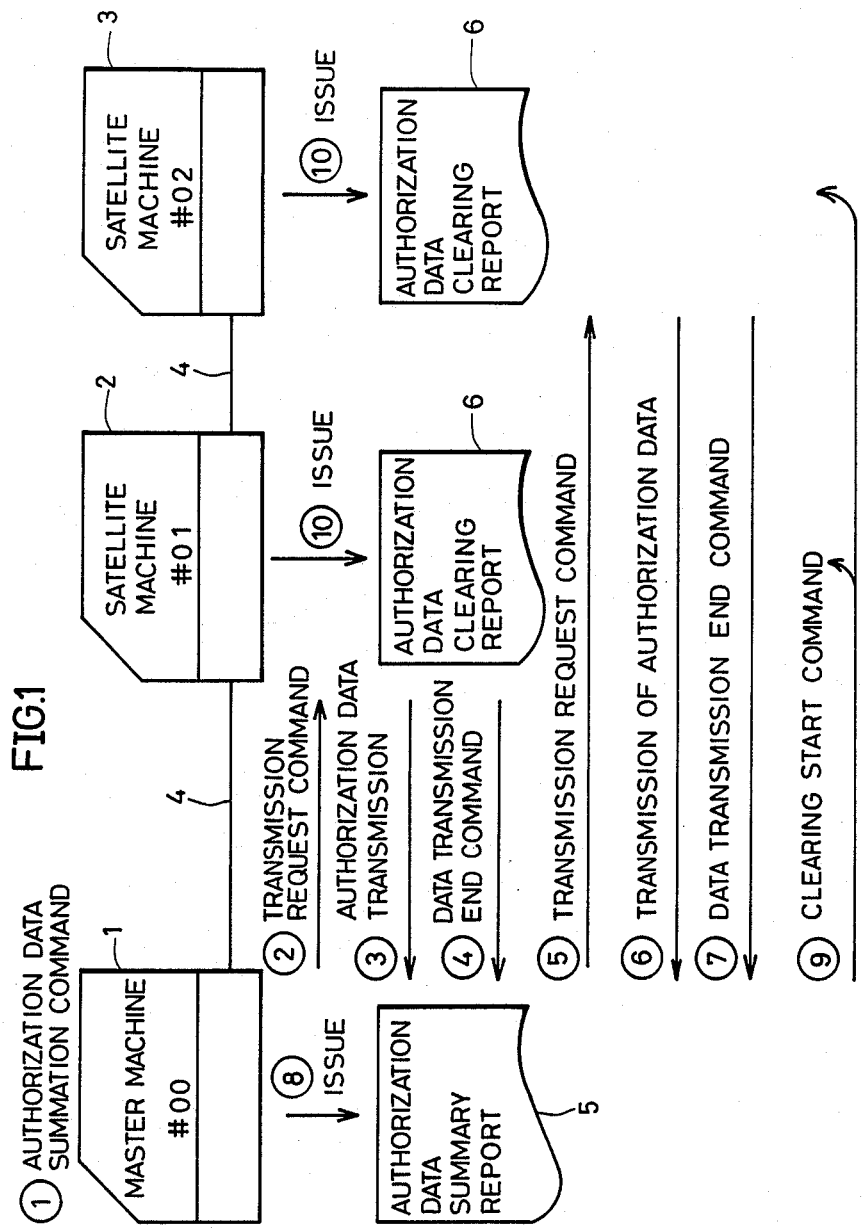
FIG. 1 illustrates the structure of a card authorization system to which a card authorization apparatus according to an embodiment of the present invention is applied.

FIG. 1 illustrates the structure of a card authorization system to which a card authorization apparatus according to an embodiment of the present invention is applied. Referring to FIG. 1, the card authorization system in this embodiment comprises a master machine 1, and satellite machines 2 and 3 which are connected to the master machine 1 through a communication line 4. The master machine 1 is implemented by a card authorization apparatus having a data summing function according to the embodiment of the present invention, and the satellite machines 2 and 3 are formed by those having no data summing function.

The charge for articles sold on credit through a card authorization apparatus is transferred later from a customer's account, which is provided in either a bank or a store selling the articles on credit. It is to be noted that the card authorization apparatus according to the present invention is applicable to both of a transaction mode called credit authorization for transferring the charge from a bank account and that called debit authorization for transferring the charge from an account provided in a store.

Description is now briefly made on operation of the card authorization system as shown in FIG. 1.

Every time a credit sale is performed, the machine utilized for a credit sale stores authorization data on the credit sale. The stored authorization data includes data on items such as the number of the credit card, the customer's account number, the amount of charge for the credit sale, code numbers for the articles sold on credit and the method of payment.

An operator operates the master machine 1 upon completion of a day's credit sale for example, to command summation of the authorization data. In response to the summation command, the master machine 1 transmits an authorization data transmission request command to the satellite machine 2 through the communication line 4. The satellite machine 2 responsively transmits the authorization data stored therein to the master machine 1, and then transmits a data transmission end command at the end of the authorization data transmission to inform the master machine 1 of the end of the data transmission. Receiving the data transmission end command, the master machine 1 transmits an authorization data transmission request command to the other satellite machine 3. The satellite machine 3 transmits the authorization data stored therein to the master machine 1 in a similar manner to the above, and then transmits a data transmission end command at the end of the data transmission.

The master machine 1 sums the authorization data received from the satellite machines 2 and 3, to issue an authorization data summary report 5.

Then the operator operates the master machine 1 to enter a clearing command, whereby the master machine 1 transmits clearing start commands to the satellite machines 2 and 3 through the communication line 4. Receiving the clearing start commands, the satellite machines 2 and 3 issue authorization data clearing reports 6, and then clear the authorization data stored therein.

Figure 2:
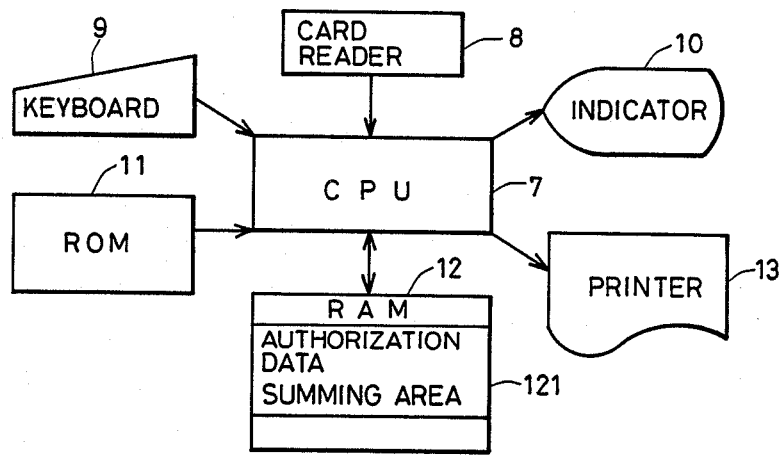
FIG. 2 is a schematic block diagram showing the electrical structure of the card authorization apparatus according to the embodiment of the present invention.

FIG. 2 is a schematic block diagram showing the electrical structure of the card authorization apparatus according to the embodiment of the present invention. Referring to FIG. 2, the card authorization apparatus comprises a CPU 7, which is connected with a card reader 8, a keyboard 9, an indicator 10, a ROM 11, a RAM 12 and a printer 13.

Figure 6:
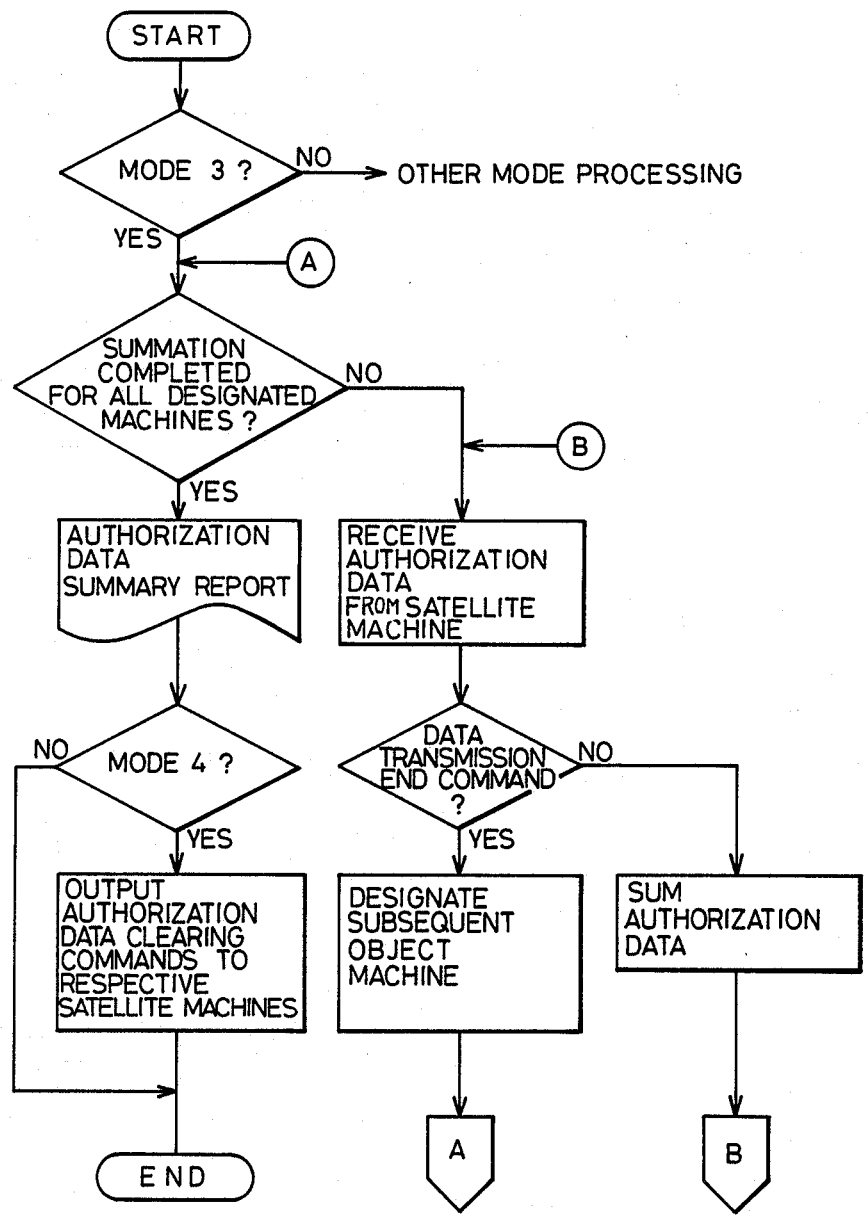
FIG. 6 is a flow chart for illustrating operation of the card authorization apparatus according to the preferred embodiment of the present invention.

The card reader 8 is adapted to read data on the card number, the customer's account number and the like from, e.g., the credit card used for the credit sale. The keyboard 9 includes a ten-key pad for keyboard entry of the article code numbers, the amount of charge and the like, a command key for entering various commands, a mode key for designating a summation processing mode, a clearing processing mode and the like as hereinafter described with reference to FIG. 3. The indicator 10 is adapted to display guide characters for the operation and the data entered through the keyboard 9. The ROM 11 is adapted to store an operation program for the CPU 7 based on a flow chart as shown in FIG. 6. The RAM 12 includes an authorization data summing area 121 for storing the authorization data received from the satellite machines 2 and 3 and summing the same. The printer 13 is adapted to issue the authorization data summary report 5 as shown in FIG. 1.

Figure 3:
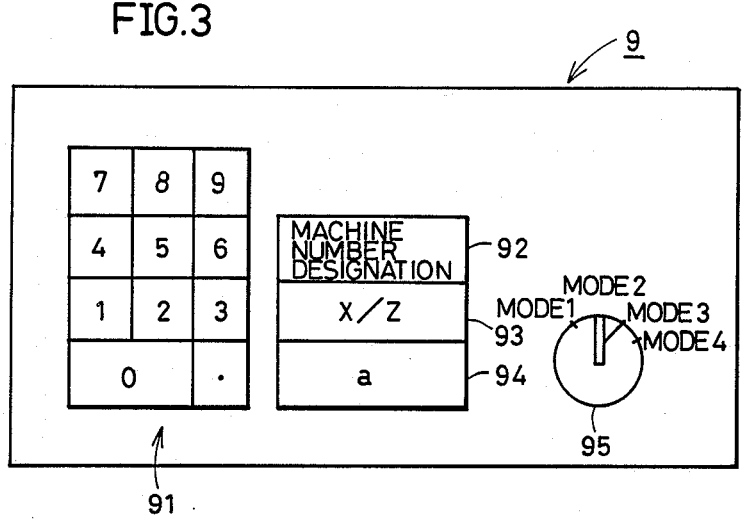
FIG. 3 illustrates the layout of a keyboard as shown in FIG. 2.

FIG. 3 illustrates the layout of the keyboard 9 as shown in FIG. 2. Referring to FIG. 3, the keyboard 9 is provided with a ten-key pad 91, a machine number designating key 92, an X/Z key 93, an @ key 94 and a mode key 95.

The ten-key pad 91 is used for keyboard entry of the amount of charge, the article codes and the like as well as codes for designating the machine numbers of the satellite machines 2 and 3 and codes defined in correspondence to various commands.

The machine number designating key 92 is adapted to designate the machine numbers as hereinafter described with reference to FIG. 4, and operated upon keyboard entry of the machine numbers through the ten-key pad 91.

The X/Z key 93 is operated upon keyboard entry of a transmission request code through the ten-key pad 91 in order to present an authorization data transmission request as hereinafter described with reference to FIG. 5.

The @ key 94 is not related to the present invention, and hence description thereof is omitted.

The mode key 95 is adapted to designate operation modes. This mode key 95 is set at, e.g., MODE 3 (summation indicating mode) for summing the authorization data while being set at, e.g., MODE 4 (clearing instructing mode) for clearing the authorization data.

Figure 4:
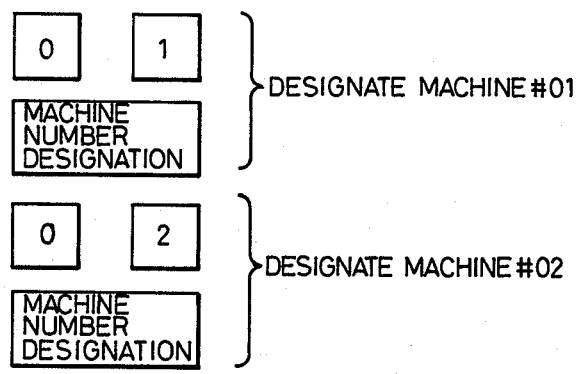
FIG. 4 illustrates a key operation for summing authorization data.

FIG. 4 illustrates the key operation for designating object machines for summation of the authorization data. In order to designate the satellite machine 2, the machine number "01" is entered through the ten-key pad 91, and then the machine number designating key 92 is pressed as shown in FIG. 4. In order to designate the satellite machine 3, the machine number "02" is entered through the ten-key pad 91 and then the machine number designating key 92 is pressed.

Figure 5:
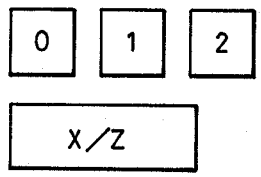
FIG. 5 illustrates a key operation for requesting transmission of authorization data.

FIG. 5 illustrates the key operation for requesting the satellite machines 2 and 3 to transmit the authorization data. In order to request transmission of the authorization data, for example, keys "0", "1" and "2" are pressed on the ten-key pad 91, and then the X/Z key 93 is touched.

FIG. 6 is a flow chart for illustrating the operation of the embodiment of the present invention. Description is now made on the operation of this embodiment with reference to FIGS. 1 to 6.

The operator sets the mode key 95 at MODE 3 and performs the key operation as shown in FIG. 4 to designate an object machine for summation of the authorization data. Then the operator performs the key operation as shown in FIG. 5, to request transmission of the authorization data to the object machine. The CPU 7 of the card authorization apparatus responsively determines whether or not the mode key 95 is set at MODE 3. If the mode key 95 is not set at MODE 3, the CPU 7 performs processing corresponding to another mode, while the same transmits an authorization data transmission request command to the designated satellite machine.

Then the CPU 7 determines whether or not summation of the authorization data is completed with respect to all of designated machines. If the determination is no, the CPU 7 waits until the authorization data are received from the satellite machine, to store the authorization data in the RAM 12 while summing the same in the authorization data summing area 121 of the RAM 12 upon receiving of the authorization data. The summation processing is performed per customer or article class, for example. The CPU 7 sums the authorization data until a data transmission end command is received from the satellite machine. Receiving the data transmission end command, the CPU 7 transmits an authorization data transmission request command to a subsequent object machine for summation of the authorization data. When the authorization data are received from the said object machine, the CPU 7 performs summing operation similarly to the above.

Upon completion of summation of the authorization data from all of the object machines, the CPU 7 prints out summation data through the printer 13, thereby to issue an authorization data summary report.

In order to clear the authorization data in the satellite machines, the operator sets the mode key 95 at MODE 4. When MODE 4 is selected subsequently to issuance of the summary report, the CPU 7 transmits authorization data clearing commands to the object satellite machines whose authorization data have been summed, to terminate the operation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A card authorization apparatus for receiving authorization data from other card authorization apparatuses having no data summing function to sum said authorization data, said card authorization apparatus comprising:

summation instructing means for instructing summation of said authorization data;

transmission control means for transmitting requests for transmission of authorization data to said other card authorization apparatuses having no data summing function in response to instruction by said summation instructing means;

summing means for summing said authorization data in response to receiving of said authorization data from said other card authorization apparatuses having no data summing function; and summary report issuing means for issuing a summary report on the basis of said authorization data summed by said summing means.

2. A card authorization apparatus in accordance with claim 1, further comprising clearing instructing means for instructing clearing of said authorization data, said transmission control means transmitting requests for clearing of said authorization data to said other card authorization apparatuses having no data summing function in response to instruction by said clearing instructing means.

* * * * *